United States Patent
Lee et al.

(10) Patent No.: US 7,343,054 B1
(45) Date of Patent: Mar. 11, 2008

(54) INTEGRATED ELECTRO-OPTIC MODULE FOR HIGH SPEED DATA TRANSMISSION

(75) Inventors: Michael G. Lee, San Jose, CA (US); Alexei L. Glebov, San Mateo, CA (US); Dashun Steve Zhou, San Jose, CA (US)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 11/619,868

(22) Filed: Jan. 4, 2007

(51) Int. Cl.
*G02F 1/035* (2006.01)
*G02B 6/10* (2006.01)

(52) U.S. Cl. ............................ 385/2; 385/11; 385/14
(58) Field of Classification Search ............ 385/2, 385/11, 14
See application file for complete search history.

(56) References Cited

U.S. PATENT DOCUMENTS

| | | | | |
|---|---|---|---|---|
| 4,685,763 | A * | 8/1987 | Tada et al. ................. | 385/8 |
| 5,757,986 | A * | 5/1998 | Crampton et al. ............ | 385/2 |
| 5,764,822 | A * | 6/1998 | Madabhushi ................ | 385/14 |
| 6,600,842 | B2 * | 7/2003 | Yamada ..................... | 385/2 |
| 6,614,960 | B2 * | 9/2003 | Berini ...................... | 385/39 |
| 2002/0071621 | A1 * | 6/2002 | Yamada ..................... | 385/2 |
| 2003/0002766 | A1 * | 1/2003 | Pruneri et al. .............. | 385/2 |
| 2004/0047531 | A1 * | 3/2004 | Fujita et al. ................. | 385/11 |
| 2006/0098917 | A1 * | 5/2006 | Gorni et al. ................. | 385/50 |
| 2006/0210216 | A1 * | 9/2006 | Lee et al. .................... | 385/14 |

\* cited by examiner

*Primary Examiner*—Frank G. Font
*Assistant Examiner*—Eric Wong
(74) *Attorney, Agent, or Firm*—Baker Botts L.L.P.

(57) ABSTRACT

An integrated electro-optic module may contain a continuous layer of electro-optic polymer through both a splitter portion and a modulator portion in order to facilitate high speed data transmission. The integrated electro-optic module may be fabricated by depositing a bottom cladding layer on a wafer, creating side cladding features, depositing the electro-optic polymer, and coating with a top cladding layer. The electro-optic polymer in both the splitter portion and modulator portion of the integrated electro-optic module may create inverted-ridge waveguide structures. The waveguide in the splitter portion may have a first ridge depth, and the waveguide in the modulator portion may have a second ridge depth, the first ridge depth greater than the second ridge depth.

22 Claims, 5 Drawing Sheets

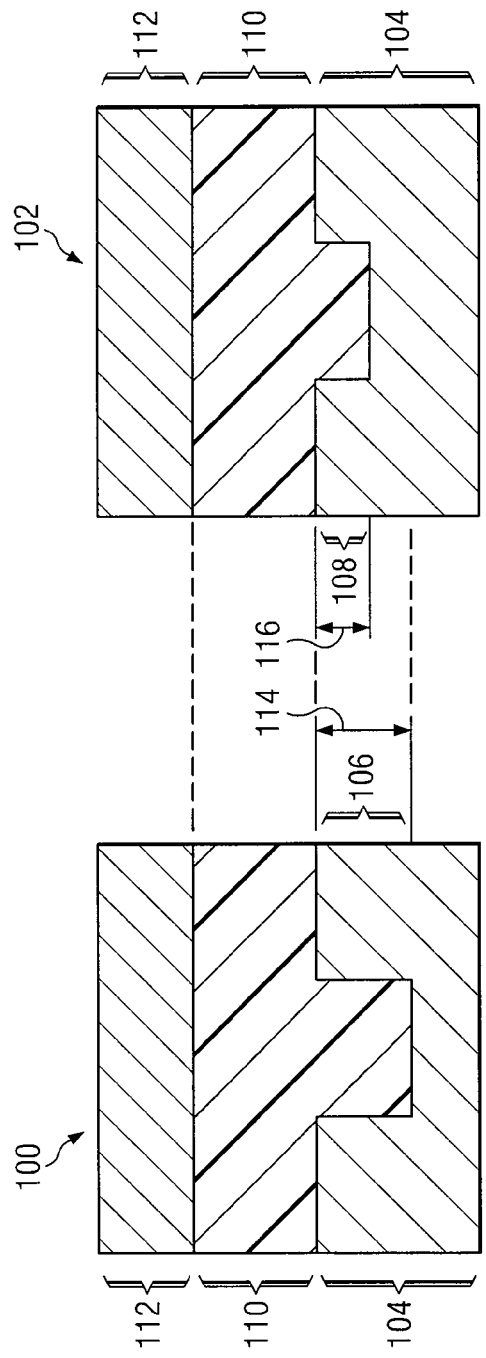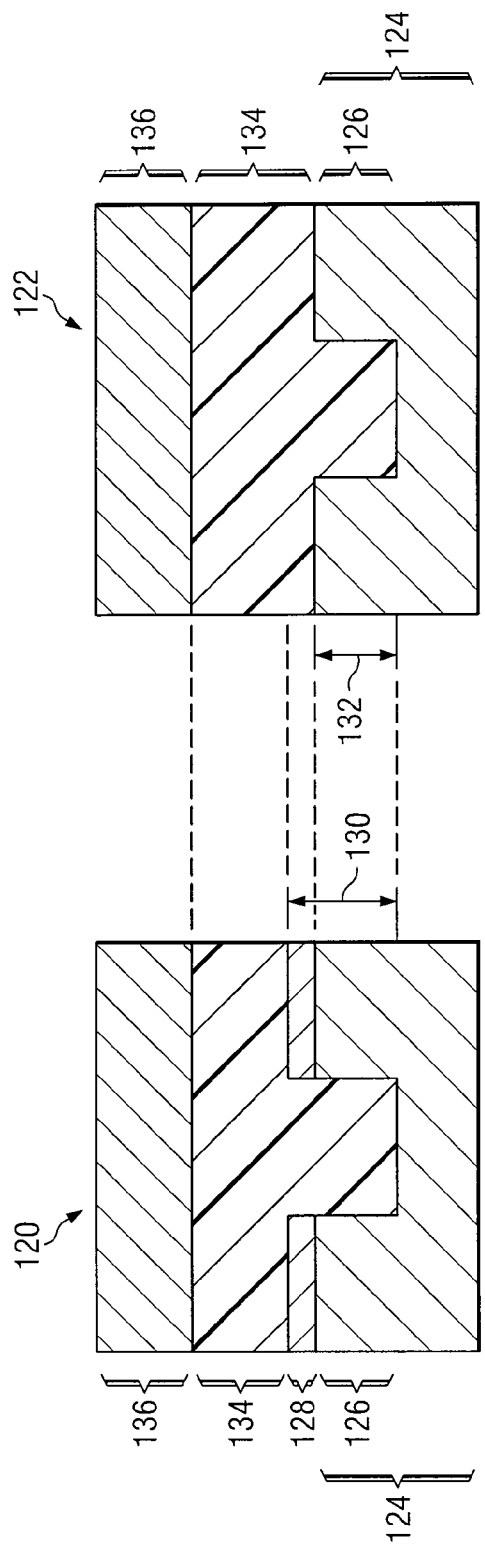

INTEGRATED ELECTRO-OPTIC MODULE FOR HIGH SPEED DATA TRANSMISSION

TECHNICAL FIELD OF THE INVENTION

The present invention relates generally to photonics circuits and, more particularly, to an integrated electro-optic module for high speed data transmission.

BACKGROUND OF THE INVENTION

Copper electrical interconnections between separate devices (e.g., chips or boards) are expected to support data rates of up to fifteen gigabits per second. However, due to high latency, cross-talk between channels, frequency-dependent loss, high power dissipation, and other factors, copper interconnections will likely run into significant challenges when data transmission rates exceed that amount. Optical interconnections provide good solutions with respect to some of these issues, but create their own set of difficulties.

SUMMARY

In accordance with the present invention, techniques for generating an integrated electro-optic module for high speed data transmission are provided. According to particular embodiments, these techniques describe a method of fabricating an integrated electro-optic module containing a continuous layer of electro-optic material through both a splitter portion and a modulator portion.

According to a particular embodiment, a method for fabricating an integrated electro-optic module includes depositing a bottom cladding layer on a wafer and creating side cladding features. The side cladding features have a first ridge depth in a splitter portion and a second ridge depth in a modulator portion, where the first ridge depth is greater than the second ridge depth. The method also includes depositing an electro-optic polymer. The electro-optic polymer forms an electro-optic layer with a first inverted-ridge structure in the modulator portion and a second inverted-ridge structure in splitter portion. The method also includes depositing a top cladding layer, which covers the electro-optic layer. The splitter portion includes at least one split for dividing a light wave into a plurality of channels. The modulator portion comprises a plurality of modulators, which each correspond to one of the plurality of channels and include a first path, a second path, and an interference point where the first path and the second path intersect.

Embodiments of the invention provide various technical advantages. For example, these techniques may increase coupling efficiency between the splitter portion and the modulator portion, making the integrated electro-optic module suitable for high data rate applications. In some embodiments, the ridge depth in the splitter portion of the integrated electro-optic module is greater than the ridge depth in the modulator portion. This may reduce bending loss encountered in the splitter portion, allowing the length of the splitter portion to be reduced. A shorter splitter portion may make the integrated electro-optic module compact enough for chip-to-chip optical interconnects, while remaining suitable for high data rate applications. In particular embodiments, lithographic patterning techniques are used, which may increase alignment accuracy and make the integrated electro-optic module suitable for fine-pitch devices. In some embodiments, the occurrence of cross-talk between channels is reduced or eliminated, as cross-talk in optical interconnections may be caused by or increased with misalignment between the splitter portion and the modulator portion.

Also, in certain embodiments, integrating the splitter portion and the modulator portion into an integrated electro-optic module reduces or eliminates the need for assembly. Additionally, better reliability may be achieved when the integrated electro-optic module contains no assembled parts, epoxy adhesive, or the like. In some embodiments, using lithography techniques to fabricate the integrated electro-optic module reduces the impact from geometric variations (e.g., in thickness and width). In certain embodiments, the method of integrating the electro-optic module is flexible, allowing fine-tune alignment of the waveguides in the splitter portion and the waveguides in the modulator portion so as to achieve better coupling efficiency. Also, in particular embodiments, the method of fabricating an integrated electro-optic module is more economical than previous methods. Many layers in the splitter portion may be built at the same time as, using the same materials as, and/or with the same process steps as layers in the modulator portion.

Other technical advantages of the present invention will be readily apparent to one skilled in the art from the following figures, descriptions, and claims. Moreover, while specific advantages have been enumerated above, various embodiments may include all, some, or none of the enumerated advantages.

BRIEF DESCRIPTION OF THE DRAWINGS

For a more complete understanding of the present invention and its advantages, reference is made to the following description taken in conjunction with the accompanying drawings in which:

FIGS. 3A-D illustrate cross-sections of a waveguide in a splitter portion and a waveguide in a modulator portion for different embodiments of an integrated electro-optic module;

DETAILED DESCRIPTION OF THE DRAWINGS

Figure 1:
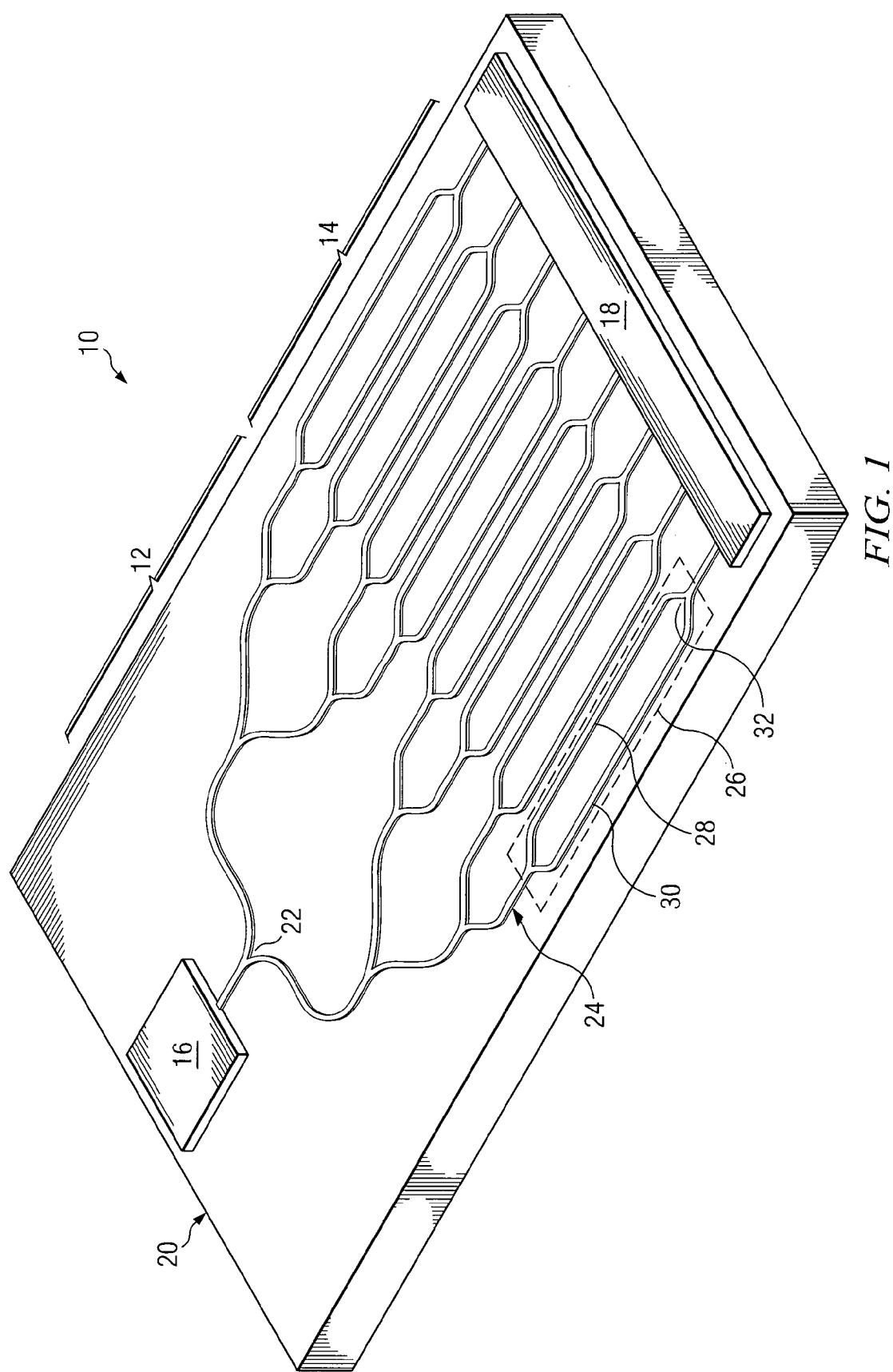
FIG. 1 illustrates an integrated electro-optic module.

FIG. 1 illustrates an integrated electro-optic module, indicated generally at 10, containing a continuous layer of electro-optic material through both a splitter portion, indicated generally at 12, and a modulator portion, indicated generally at 14. As illustrated, integrated electro-optic module 10 includes optical source 16, splitter portion 12, modulator portion 14, and photodetectors 18. In particular embodiments, integrated electro-optic module 10 is constructed on a single wafer 20. In certain embodiments, wafer 20 is formed from silicon. In general, elements within integrated electro-optic module 10 interconnect in order to provide high speed data transmission.

Generally, optical source 16 produces one or more light waves. In particular embodiments, optical source 16 is a laser diode producing a continuous wave laser beam. In other embodiments, optical source 16 may be any suitable device producing any appropriate type of light wave(s).

Splitter portion 12 divides a light wave received from optical source 16 into a plurality of channels 24. In the illustrated embodiment, splitter portion 12 receives a light wave from optical source 16. The splitter portion 12 may direct the received light wave through a plurality of splits 22. In some embodiments, each split 22 divides and sends the light wave into two separate branches. In other embodiments, each split 22 divides and sends the light wave into any suitable number of branches. In particular embodiments, some branches lead to additional splits 22. Splitter portion 12 may create a plurality of channels 24 through the use of splits 22. As illustrated, splitter portion 12 contains seven splits 22 and eight channels 24. It is understood that, while a particular number of splits 22 and channels 24 are illustrated, splitter portion 12 may include any suitable number of splits 22 and channels 24. In some embodiments, splitter portion 12 receives light waves from more than one optical source 16. In particular embodiments, the waveguides in splitter portion 12 are structured as inverted-ridge waveguides. In certain embodiments, the waveguides in splitter portion 12 are formed from electro-optic material.

Modulator portion 14 manipulates the properties of certain light waves traveling through modulator portion 14. In particular embodiments, modulator portion 14 modifies the properties of a light wave to form optical signals based on electrical signal inputs. In some embodiments, modulator portion 14 uses an electric field(s) to modulate the light wave (which functions as a carrier) with bits of binary data.

As illustrated, modulator portion 14 includes a plurality of modulators 26, each corresponding to one of channels 24. In certain embodiments, each modulator 26 corresponds to one bit of binary data. In particular embodiments, each modulator 26 includes a first path 28 and a second path 30. Modulators 26 may continue from one of channels 24 and divide the light wave into first path 28 and second path 30. In particular embodiments, split 22 may be used to divide the light wave into first path 28 and second path 30. As illustrated, first path 28 and second path 30 intersect at interference point 32. In some embodiments, the light wave either constructively interferes at interference point 32 or destructively interferes at interference point 32. Constructive interference may produce a light wave with an intensity above a threshold value, while destructive interference may produce a light wave with an intensity below a threshold value. In certain embodiments, photodetectors 18 will interpret a light wave with an intensity above the threshold value as a binary "1" and a light wave with an intensity below the threshold value as a binary "0." In other embodiments, photodetectors 18 will interpret a light wave with an intensity above the threshold value as a binary "0" and a light wave with an intensity below the threshold value as a binary "1." It is to be understood that modulator portion 14 may operate in any suitable manner to manipulate the properties of certain light waves in order to transform electrical signals into optical signals.

In particular embodiments, an electric field or electric fields applied across either first path 28 or second path 30 or both in some, all, or none of modulators 26 may cause light waves to either constructively or destructively interfere at interference points 32. For example, an electric field applied across first path 28 in a selected one of modulators 26 may increase the refractive index of material in the waveguide of first path 28, which may cause the light wave traveling through first path 28 to have a decreased velocity. Thus, the light wave traveling though first path 28 may be phase-shifted from the light wave traveling through second path 30. At interference point 32 corresponding to the selected modulator 26, the light wave exiting first path 28 and the light wave exiting second path 30 may destructively interfere, resulting in a light wave of a lower intensity. In some embodiments, the lower intensity approximates the lack of a light wave. This condition may be interpreted by photodetectors 18 as a different binary bit than a light wave having an intensity above a given threshold.

While modulator portion 14 is illustrated as containing eight modulators 26, it is understood that modulator portion 14 may include any suitable number of modulators 26. Additionally, while each modulator 26 is depicted as containing first path 28 and second path 30, it is understood that modulator 26 may be constructed in any suitable manner in order to manipulate the properties of certain light waves traveling through modulator portion 14.

In particular embodiments, the waveguides in modulator portion 14 are structured as inverted-ridge waveguides. In certain embodiments, the waveguides in modulator portion 14 are formed from electro-optic material. In some embodiments, modulator portion 14 is integrated onto the same electro-optic device as splitter portion 12. Thus, in certain embodiments, layers forming splitter portion 12 may be built at the same time as, using the same materials as, and/or with the same process steps as layers in modulator portion 14. Integrating modulator portion 14 and splitter portion 12 may increase coupling efficiency between splitter portion 12 and the modulator portion 14, making integrated electro-optic module 10 suitable for high data rate applications. In particular embodiments, lithographic patterning techniques are used, which may increase alignment accuracy between splitter portion 12 and modulator portion 14, making integrated electro-optic module 10 suitable for fine-pitch devices. In some embodiments, the occurrence of cross-talk between channels 24 is reduced or eliminated, as cross-talk may be caused by or increased with misalignment between splitter portion 12 and modulator portion 14. Also, in certain embodiments, integrating splitter portion 12 and the modulator portion 14 reduces or eliminates the need for assembly of integrated electro-optic module 10. Better reliability may be achieved when integrated electro-optic module 10 contains no assembled parts or epoxy adhesive.

Photodetectors 18 represent any suitable devices for the detection of the light waves transmitted from modulator portion 14. In some embodiments, photodetectors 18 are integrated into a separate device. In particular embodiments, photodetectors 18 convert the light waves received through modulators 26 into bits of binary data. In certain embodiments, each of photodetectors 18 corresponds to one of modulators 26 and determines whether the intensity of the light wave received from modulator 26 is above or below a threshold value. Photodetectors 18 may use this information in order to determine whether the light wave transmitted a binary "0" or "1." In some embodiments, photodetectors 18 use this information in order to convert optical signals into electrical signals.

In operation of a particular embodiment, light waves are generated by optical source 16 and transmitted to splitter portion 12. Splitter portion 12, using splits 22, divides the light signal into a plurality of different channels 24. The light waves from each of channels 24 enters a corresponding modulator 26 in modulator portion 14. In particular embodiments, the light waves travel through a continuous material from splitter portion 12 to modulator portion 14. Some, all, or none of modulators 26 in modulator portion 14 may manipulate the optical properties of the light waves. After traveling through modulator portion 14 the light waves are received and detected by photodetectors 18.

Moreover, in some embodiments, integrated electro-optic module 10 includes a top electrode and a bottom electrode (not illustrated) for applying an electric field across modulators 26 in modulator portion 14. Top electrode and bottom electrode may be formed using any suitable methods. For example, top electrode and bottom electrode may be formed by depositing conductive material using semiconductor fabrication techniques. In particular embodiments, top electrode and bottom electrode are located to correspond to modulators 26.

Particular embodiments of an integrated electro-optic module containing a continuous layer of electro-optic material through both a splitter portion and a modulator portion have been described and are not intended to be all inclusive. While integrated electro-optic module 10 is depicted as containing a certain configuration and arrangement of elements, it should be noted that this is an example, and the components and functionality of integrated electro-optic module 10 may be combined, separated, distributed, supplemented, and modified as appropriate. Also, the functionality of integrated electro-optic module 10 may be provided by any suitable collection and arrangement of components. Splitter portion 12 and modulator portion 14 may have any appropriate functions and may be structured in any suitable way to provide a continuous layer of electro-optic material through both splitter portion 12 and modulator portion 14.

Figure 2:
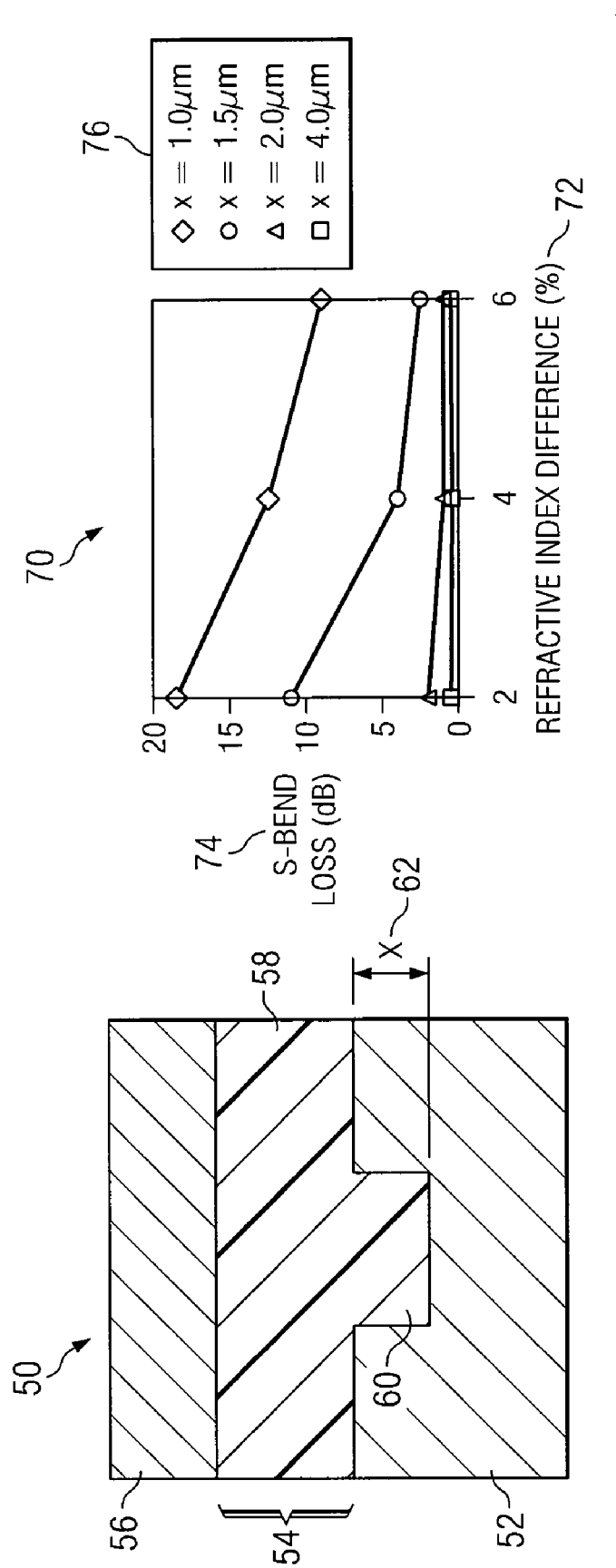
FIG. 2 illustrates a cross-section of a waveguide in a splitter portion of an integrated electro-optic module and the effect of the waveguide's ridge depth on bending loss.

FIG. 2 illustrates a cross-section of a waveguide, indicated generally at 50, in splitter portion 12 of integrated electro-optic module 10 and the effect of the waveguide's ridge depth on bending loss. As illustrated, waveguide 50 includes bottom clad 52, electro-optic layer 54, and top clad 56.

Bottom clad 52 is used with the top clad 56 to surround and assist in the functionality of electro-optic layer 54. In particular embodiments, bottom clad 52 is formed from a polymer material. The polymer material may be, for example, UV15, which is a commercially available epoxy made by MASTER BOND, INC. that can be cured by ultraviolet light. In other embodiments, bottom clad 52 is formed from any suitable material. As illustrated, bottom clad 52 includes a bottom cladding layer and side cladding features. In certain embodiments, bottom clad 52 is formed using traditional semiconductor fabrication techniques. In some embodiments, bottom clad 52 is formed by spin-coating bottom cladding material on a wafer and then properly curing bottom clad 52. In some embodiments, side cladding features are patterned by lithographic techniques.

In general, electro-optic layer 54 guides light waves through splitter portion 12. As illustrated, electro-optic layer 54 is structured as an inverted-ridge waveguide. In particular embodiments, electro-optic layer 54 comprises an electro-optic polymer. The electro-optic polymer may have optical properties that are changed when an electric field is applied across the electro-optic polymer. In other embodiments, electro-optic layer 54 is composed of any suitable material (s). In certain embodiments, bottom clad 52 is formed using traditional semiconductor fabrication techniques. In particular embodiments, electro-optic layer 54 is formed by spin coating electro-optic polymer on bottom clad 52 and then curing the electro-optic polymer. While waveguide 50 is illustrated as having electro-optic layer 54, it is understood that waveguide 50 may include any suitable optic layer for guiding light waves through splitter portion 12. In particular embodiments, electro-optic layer 54 has a different refractive index than bottom clad 52 and top clad 56.

In the illustrated embodiment, electro-optic layer 54 contains slab 58 and ridge 60, which has a ridge depth 62. As illustrated electro-optic layer 54 is structured as an inverted-ridge waveguide and looks remotely like a capital "T." Slab 58 comprises the top of the "T," while ridge 60 comprises the leg of the "T." In particular embodiments, slab 58 and ridge 60 are composed of the same material. In other embodiments, slab 58 and ridge 60 may include differing materials. As illustrated, ridge 60 has a ridge depth 62. In certain embodiments, ridge depth 62 corresponds to the depth of side cladding features.

Top clad 56 may be used with bottom clad 52 to contain and house electro-optic layer 54. In particular embodiments, top clad 56 is formed from a polymer material, such as UV15. In other embodiments, top clad 56 is formed from another suitable material. As illustrated, bottom clad 52 includes a bottom cladding layer and side cladding features. In certain embodiments, top clad 56 is formed by spin-coating top cladding material on top of electro-optic layer 54, and then properly curing top clad 56. In some embodiments, top clad 56 is constructed from the same material and in the same manner as bottom clad 52.

Additionally, while not illustrated, waveguide 50 may include any other suitable components, devices, or elements. For example, in some embodiments, waveguide 50 includes a top electrode and a bottom electrode (not illustrated) for applying an electric field across waveguide 50. Top electrode and bottom electrode may be formed using any suitable methods. For example, top electrode and bottom electrode may be formed by depositing conductive material using semiconductor fabrication techniques. In particular embodiments, top electrode and bottom electrode are located to correspond to modulators 26. In some embodiments, a waveguide in modulator portion 14 has substantially the same structure as waveguide 50.

A graph, indicated generally at 70, illustrates the effect of the value of ridge depth 62 on bending loss. Graph 70 represents sample results obtained for a cascade two millimeters long with a bending radius of four millimeters. Graph 70 includes a horizontal axis 72, a vertical axis 74, and a key 76. Horizontal axis 72 contains values for the percentage difference between the refractive index of electro-optic layer 54 and the refractive index of bottom clad 52 and top clad 56. As illustrated, horizontal axis 72 includes the values 2%, 4%, and 6% difference in refractive index. Vertical axis 74 indicates different values of S-bend loss, represented in decibels (dB). As illustrated, vertical axis 74 includes the values 0 dB, 5 dB, 10 dB, 15 dB, and 20 dB.

Key 76 provides a legend to indicate which ridge depth 62 corresponds to which line on graph 70. Key 76 indicates that a value of ridge depth 62 equal to one micrometer (1 μm) corresponds to the top line, indicated by diamonds. A value of ridge depth 62 equal to 1.5 μm corresponds to the next line from the top, indicated by squares. A value of ridge depth 62 equal to 2 μm corresponds to the next line, indicated by triangles. A value of ridge depth 62 equal to 4 μm corresponds to the bottom line and is indicated by Xs. As can be seen from graph 70, increasing ridge depth 62 improves S-bend loss in splitter portion 12. In some embodiments, an increased ridge depth 62 helps to confine the mode field, making the light wave less leaky when light propagates through a curved waveguide, e.g., waveguide 50.

Particular embodiments of waveguide 50 in integrated electro-optic module 10 have been described and are not intended to be all inclusive. While waveguide 50 is depicted as containing a certain configuration and arrangement of elements, it should be noted that this is an example, and the components and functionality of waveguide 50 may be combined, separated, distributed, supplemented, and modified as appropriate. The functions performed by the various elements of waveguide 50 may be accomplished by any suitable elements to provide guide a light wave through a part of integrated electro-optic module 10.

FIGS. 3A-D illustrate cross-sections of a waveguide in splitter portion 12 and a waveguide in modulator portion 14 for different embodiments of integrated electro-optic module 10. In some embodiments, the waveguides are similar to waveguide 50.

FIG. 3A illustrates example elements formed by an "undercut method" of fabricating integrated electro-optic module 10, including a splitter waveguide 100 and a modulator waveguide 102. According to this fabrication technique, a particular integrated electro-optic module 10 may be fabricated by first depositing a bottom cladding layer 104. In some embodiments, bottom cladding layer 104 is deposited uniformly throughout splitter waveguide 100 and modulator waveguide 102. In particular embodiments, bottom cladding layer 104 is deposited using traditional semiconductor fabrication techniques. A fabrication device then may remove a section 106 of bottom cladding layer 104 in splitter waveguide 100 and a section 108 of bottom cladding layer 104 in modulator waveguide 102. Section 106 has a ridge depth 114 greater than the ridge depth 116 of section 108. In particular embodiments, the removal of section 106 forms side cladding features adjacent to section 106, and the removal of section 108 forms side cladding features adjacent to section 108.

After the fabrication device removes section 106 and section 108, an electro-optic material is deposited, creating electro-optic layer 110. Electro-optic layer 110 may then be coated with top cladding layer 112. In particular embodiments, top cladding layer 112 and bottom cladding layer 104 are formed of the same material. Splitter waveguide 100 is, thus, a cross-section of a particular embodiment of a waveguide in splitter portion 12 that may be formed using the "undercut method," while modulator waveguide 102 is a cross-section of a particular embodiment of a waveguide in modulator portion 14 that may be formed by the "undercut method."

FIG. 3B illustrates example elements formed by a "top-over method" of fabricating integrated electro-optic module 10, including a splitter waveguide 120 and a modulator waveguide 122. According to this fabrication technique, a particular integrated electro-optic module 10 may be fabricated by first depositing a bottom cladding layer 124. In some embodiments, bottom cladding layer 124 is deposited uniformly throughout splitter waveguide 120 and modulator waveguide 122. In particular embodiments, bottom cladding layer 124 is deposited using traditional semiconductor fabrication techniques. A fabrication device then use photolithography to add a layer 126 of side cladding material. The fabrication device may add an additional layer 128 of side cladding material in splitter waveguide 120. As illustrated, splitter waveguide 120 includes layer 126 and layer 128, which comprise side cladding features for splitter waveguide 120. Modulator waveguide 122 includes layer 126, which comprises side cladding features for modulator waveguide 122. Splitter waveguide 120 also has a ridge depth 130 which is greater than ridge depth 132 associated with modulator waveguide 122.

Then, the fabrication device may deposit an electro-optic material on bottom cladding layer 124 and side cladding features (e.g., layer 126 and/or layer 128) which creates electro-optic layer 134. Finally, electro-optic layer 134 is coated with top cladding layer 136. In particular embodiments, top cladding layer 136, bottom cladding layer 124, and side cladding features are formed of the same material. Splitter waveguide 120 is, thus, a cross-section of a particular embodiment of a waveguide in splitter portion 12 that may be formed using the "top-over method," while modulator waveguide 122 is a cross-section of a particular embodiment of a waveguide in modulator portion 14 that may be formed by the "top-over method."

Figure 3C:
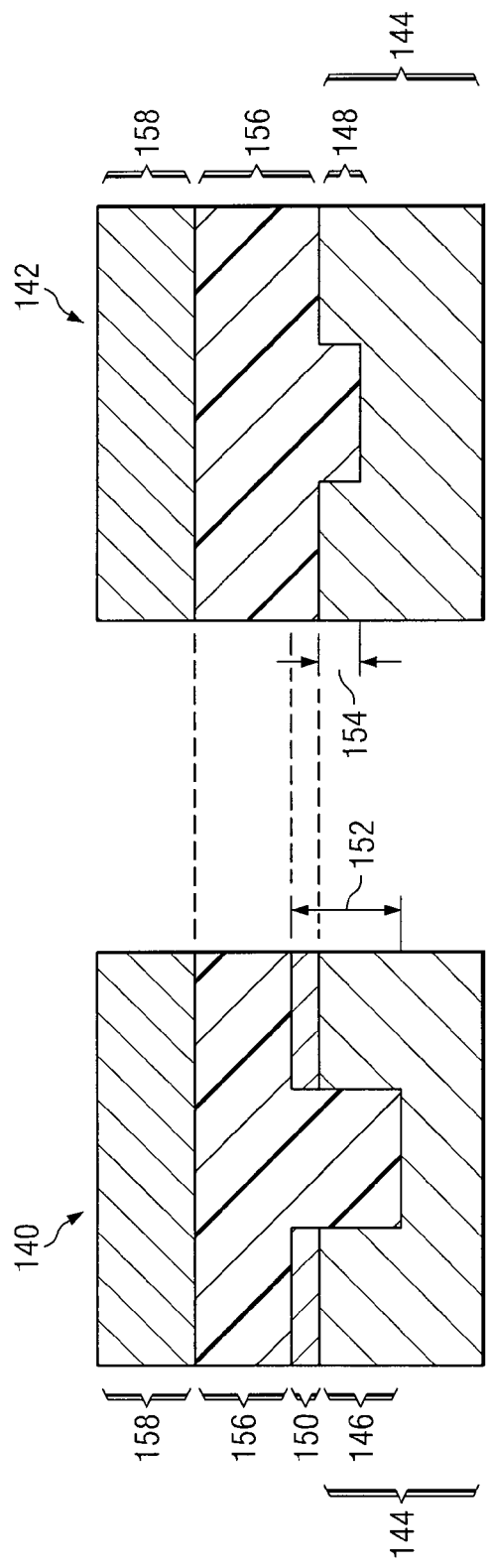

FIG. 3C illustrates example elements formed by an "adjustable method" of fabricating integrated electro-optic module 10, including a splitter waveguide 140 and a modulator waveguide 142. In particular embodiments, the adjustable method combines aspects of both the "undercut method" and the "top-over method", illustrated in FIGS. 3A and 3B, respectively.

According to this fabrication technique, a particular integrated electro-optic module 10 may be fabricated by first depositing a bottom cladding layer 144. In some embodiments, bottom cladding layer 144 is deposited uniformly throughout splitter waveguide 140 and modulator waveguide 142. In particular embodiments, bottom cladding layer 144 is deposited using traditional semiconductor fabrication techniques. A fabrication device then may remove a section 146 of bottom cladding layer 144 in splitter waveguide 140 and a section 148 of bottom cladding layer 144 in modulator waveguide 142. In the illustrated embodiment, section 146 has a ridge depth greater than the ridge depth of section 148. In other embodiments, the ridge depth of section 146 can have any suitable relation to the ridge depth of section 148.

A fabrication device may then use photolithography to add a layer 150 of side cladding material in splitter waveguide 140. As illustrated, the side cladding features in splitter waveguide 140 are formed of layer 150 and bottom cladding layer 144 adjacent to section 146. The ridge depth of these side cladding features is indicated as ridge depth 152. As illustrated, the side cladding features in modulator waveguide 142 are formed of bottom cladding layer 144 adjacent to section 148. The ridge depth of these side cladding features is indicated as ridge depth 154. As illustrated, ridge depth 152 is greater than ridge depth 154.

Then, the fabrication device may deposit an electro-optic material on bottom cladding layer 144 and side cladding features (e.g., layer 150) which creates electro-optic layer 156. Finally, electro-optic layer 156 is coated with top cladding layer 158. Electro-optic layer 156 in splitter waveguide 140 may any suitable relation of optical coupling to electro-optic layer 156 in modulator waveguide 142. In particular embodiments, top cladding layer 158, bottom cladding layer 144, and side cladding features are formed of the same material. Splitter waveguide 140 is, thus, a cross-section of a particular embodiment of a waveguide in splitter portion 12 that may be formed using the "adjustable method," while modulator waveguide 142 is a cross-section of a particular embodiment of a waveguide in modulator portion 14 that may be formed by the "adjustable method."

Figure 3D:
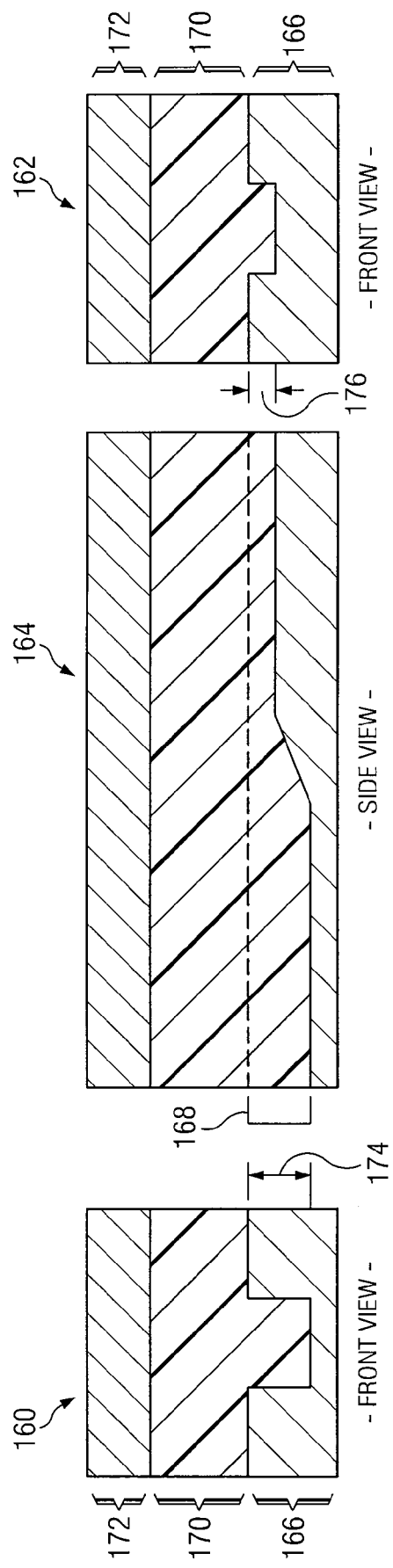

FIG. 3D illustrates example elements formed by a "gray-scale lithography method" of fabricating integrated electro-optic module 10, including a splitter waveguide 160 and a modulator waveguide 162. As illustrated, side view 164 shows an internal side view of the transition between splitter portion 12 (and splitter waveguide 160) and modulator portion 14 (and modulator waveguide 162).

According to this fabrication technique, a particular integrated electro-optic module 10 may be fabricated by first depositing a bottom cladding layer 166. In some embodiments, bottom cladding layer 166 is initially deposited uniformly throughout splitter waveguide 160 and modulator waveguide 162. In particular embodiments, bottom cladding layer 166 is deposited using traditional semiconductor fabrication techniques. A fabrication device then may remove a section 168 of bottom cladding layer 166. In the illustrated embodiment, fabrication device uses gray scale patterning in a lithography step in order to remove different amounts of bottom cladding layer 166 in splitter waveguide 160 and modulator waveguide 162. The removal of section 168 may create a ridge depth 174 in splitter waveguide 160 and a ridge depth 176 in modulator waveguide 162, where ridge depth 174 is greater than ridge depth 176.

As shown by side view 164, once removed, section 168 may leave a varying ridge depth between splitter portion 12 (and splitter waveguide 160) and modulator portion 14 (and modulator waveguide 162). In some embodiments, the slope between splitter portion 12 and modulator portion 14 is linear. In other embodiments, the slope may have any appropriate shape, including a curved shape. After the fabrication device removes section 168, an electro-optic material is deposited, creating electro-optic layer 170. Electro-optic layer 170 may then be coated with top cladding layer 172. In particular embodiments, top cladding layer 172 and bottom cladding layer 166 are formed of the same material. In certain embodiments, bottom cladding layer 166 includes bottom clad and side cladding features, while in other embodiments bottom cladding layer 166 only includes bottom clad.

Moreover, in some embodiments, electro-optic layer 110, 134, 156, 170 is continuous throughout splitter portion 12 and modulator portion 14. By integrating splitter portion 12 and modulator portion 14, these techniques may increase coupling efficiency, making integrated electro-optic module 10 suitable for high data rate applications. In some embodiments, ridge depth 114, 130, 152, 174 in splitter portion 12 being greater than ridge depth 116, 132, 154, 176 in modulator portion 14 may reduce bending loss encountered in splitter portion 12, allowing the length of splitter portion 12 to be decreased and making integrated electro-optic module 10 compact enough for chip-to-chip optical interconnects. In particular embodiments, lithographic patterning techniques are used, which may increase alignment accuracy between splitter portion 12 and modulator portion 14 and make the integrated electro-optic module suitable for fine-pitch devices. As illustrated, the fabrication device creates splitter waveguide 100, 120 140, 160 and modulator waveguide 102, 122, 142, 162 from substantially the same materials using substantially the same process steps. Thus, the method of fabricating integrated electro-optic module 10 may be more economical than previous methods—the same steps, materials, and/or fabrication devices may be used, and fabricating integrated electro-optic module 10 may not require assembly.

Particular embodiments of an integrated electro-optic module containing a continuous layer of electro-optic material through both a splitter portion and a modulator portion have been described and are not intended to be all inclusive. While different embodiments of integrated electro-optic module 10 are depicted as containing a certain configuration and arrangement of elements, it should be noted that these are examples, and the components and functionality of integrated electro-optic module 10 may be combined, separated, distributed, supplemented, and modified as appropriate. Also, the functionality of integrated electro-optic module 10 may be provided by any suitable collection and arrangement of components. For example, while integrated electro-optic module 10 is depicted and described as having a particular layering of different elements, it is understood that integrated electro-optic module 10 may include any suitable layers formed of any appropriate materials. Additionally, splitter portion 12 and modulator portion 14 may have any appropriate functions and may be structured in any suitable way to provide a continuous layer of electro-optic material through both splitter portion 12 and modulator portion 14.

Figure 4:
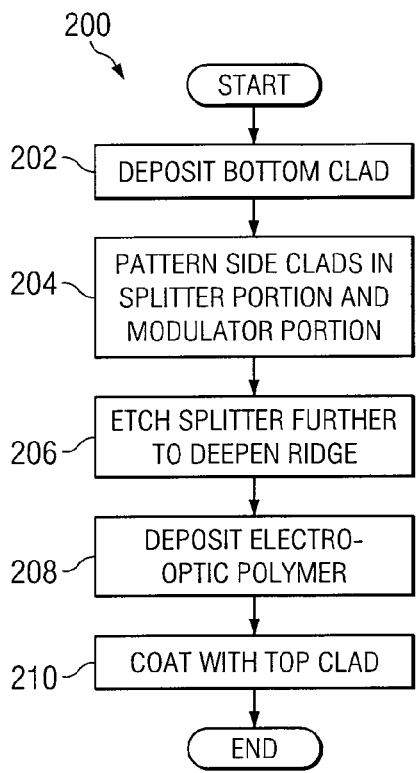
FIG. 4 is a flowchart illustrating a method of fabricating an integrated electro-optic module having the waveguide structures depicted in FIG. 3A.

FIG. 4 is a flowchart illustrating a method, indicated generally at 200, for fabricating an integrated electro-optic module having the waveguide structures depicted in FIG. 3A. At step 202, the fabrication device deposits bottom clad in particular embodiments. A bottom clad may be used with a top clad to surround and assist in the functionality of an electro-optic layer. In some embodiments, bottom clad is formed of a polymer material, such as UV15. In other embodiments, bottom clad is formed of any other suitable material. In particular embodiments, bottom clad is formed by spin coding the bottom cladding material on a wafer and then properly curing the bottom clad. Bottom clad may be bottom clad 52, bottom clad 104, bottom clad 124, bottom clad 144, and/or bottom clad 166.

At step 204, the fabrication device patterns side clads for both splitter portion 12 and modulator portion 14. In particular embodiments, the fabrication device patterns the side clads by removing material from the bottom clad. In some embodiments, the fabrication device patterns the side clads with photolithographic techniques. At step 206, the fabrication device etches the ridge in splitter portion 12 deeper than modulator portion 14. In some embodiments, step 204 and step 206 are accomplished in the same process. In other embodiments, step 204 and step 206 require separate process steps.

The fabrication device deposits electro-optic polymer in step 208. In some embodiments, the electro-optic polymer is deposited on the bottom clad and/or side clads. In particular embodiments the electro-optic polymer forms an electro-optic layer having an inverted-ridge waveguide structure. Then, the fabrication device coats the electro-optic polymer with a top clad in step 210. In certain embodiments, top clad is formed of substantially the same material as bottom clad and/or side clads. In other embodiments, top clad may be formed of any suitable material. After step 210 the method ends.

The method described with respect to FIG. 4 is merely illustrative, and it is understood that the manner and order of operation and devices indicated as performing the operations may be modified in any appropriate manner. While the method describes particular steps performed in a specific order, it should be understood that integrated electro-optic module 10 can be fabricated by any suitable collection and arrangement of elements performing some, all, or none of these steps in any operable order. For example, in some embodiments, a top electrode and a bottom electrode are added in additional steps.

Figure 5:
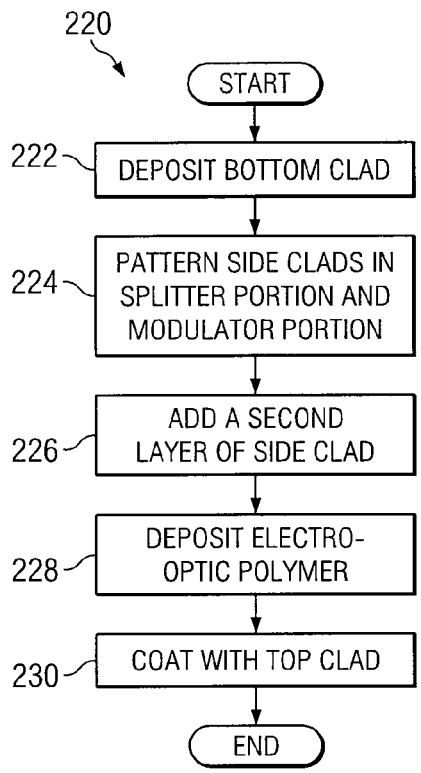
FIG. 5 is a flowchart illustrating a method of fabricating an integrated electro-optic module having the waveguide structures depicted in FIG. 3B.

FIG. 5 is a flowchart illustrating a method, indicated generally at 220, for fabricating an integrated electro-optic module having the waveguide structures depicted in FIG. 3B. At step 222, the fabrication device deposits bottom clad in particular embodiments. A bottom clad may be used with a top clad to surround and assist in the functionality of an electro-optic layer. In some embodiments, bottom clad is formed of a polymer material, such as UV15. In other embodiments, bottom clad is formed of any other suitable material. In particular embodiments, bottom clad is formed by spin coding the bottom cladding material on a wafer and then properly curing the bottom clad. Bottom clad may be bottom clad 52, bottom clad 104, bottom clad 124, bottom clad 144, and/or bottom clad 166.

At step 224, the fabrication device patterns side clads for both splitter portion 12 and modulator portion 14. In particular embodiments, the fabrication device patterns the side clads adding side cladding material. In some embodiments, the fabrication device adds side cladding material in particular locations through the use of photolithographic techniques. At step 226, the fabrication device adds a second layer of side clad in splitter portion 12. This may cause the ridge depth in splitter portion 12 to be greater than the ridge depth in modulator portion 14. In some embodiments, step 224 and step 226 are accomplished in the same process. In other embodiments, step 224 and step 226 require separate process steps.

The fabrication device deposits electro-optic polymer in step 228. In some embodiments, the electro-optic polymer is deposited on the bottom clad and/or side clads. In particular embodiments the electro-optic polymer forms an electro-optic layer having an inverted-ridge waveguide structure. Then, the fabrication device coats the electro-optic polymer with a top clad in step 230. In certain embodiments, top clad is formed of substantially the same material as bottom clad and/or side clads. In other embodiments, top clad may be formed of any suitable material. After step 230 the method ends.

The method described with respect to FIG. 5 is merely illustrative, and it is understood that the manner and order of operation and devices indicated as performing the operations may be modified in any appropriate manner. While the method describes particular steps performed in a specific order, it should be understood that integrated electro-optic module 10 can be fabricated by any suitable collection and arrangement of elements performing some, all, or none of these steps in any operable order. For example, in some embodiments, a top electrode and a bottom electrode are added in additional steps.

Figure 6:
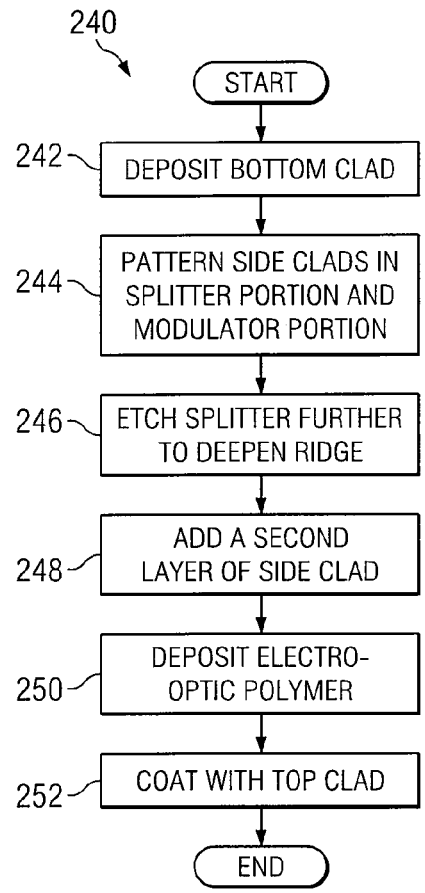
FIG. 6 is a flowchart illustrating a method of fabricating an integrated electro-optic module having the waveguide structures depicted in FIG. 3C.

FIG. 6 is a flowchart illustrating a method, indicated generally at 240, for fabricating an integrated electro-optic module having the waveguide structures depicted in FIG. 3C. At step 242, the fabrication device deposits bottom clad in particular embodiments. A bottom clad may be used with a top clad to surround and assist in the functionality of an electro-optic layer. In some embodiments, bottom clad is formed of a polymer material, such as UV15. In other embodiments, bottom clad is formed of any other suitable material. In particular embodiments, bottom clad is formed by spin coding the bottom cladding material on a wafer and then properly curing the bottom clad. Bottom clad may be bottom clad 52, bottom clad 104, bottom clad 124, bottom clad 144, and/or bottom clad 166.

At step 244, the fabrication device patterns side clads for both splitter portion 12 and modulator portion 14. In particular embodiments, the fabrication device patterns the side clads by adding side cladding material. In certain embodiments, fabrication device patterns the side clads by removing material from the bottom clad. In some embodiments, the fabrication device patterns the side clads with photolithographic techniques. At step 246, the fabrication device etches the ridge in splitter portion 12 deeper than modulator portion 14, and, at step 248, the fabrication device adds an additional layer of side cladding material in splitter portion 12. This may cause the ridge depth in splitter portion 12 to be greater than the ridge depth in modulator portion 14. In some embodiments, step 244, step 246, and/or step 248 are accomplished in the same process. In other embodiments, step 244, step 246, and/or step 248 require separate process steps.

The fabrication device deposits electro-optic polymer in step 250. In some embodiments, the electro-optic polymer is deposited on the bottom clad and/or side clads. In particular embodiments the electro-optic polymer forms an electro-optic layer having an inverted-ridge waveguide structure. Then, the fabrication device coats the electro-optic polymer with a top clad in step 252. In certain embodiments, top clad is formed of substantially the same material as bottom clad and/or side clads. In other embodiments, top clad may be formed of any suitable material. After step 252 the method ends.

The method described with respect to FIG. 6 is merely illustrative, and it is understood that the manner and order of operation and devices indicated as performing the operations may be modified in any appropriate manner. While the method describes particular steps performed in a specific order, it should be understood that integrated electro-optic module 10 can be fabricated by any suitable collection and arrangement of elements performing some, all, or none of these steps in any operable order. For example, in some embodiments, a top electrode and a bottom electrode are added in additional steps.

Figure 7:
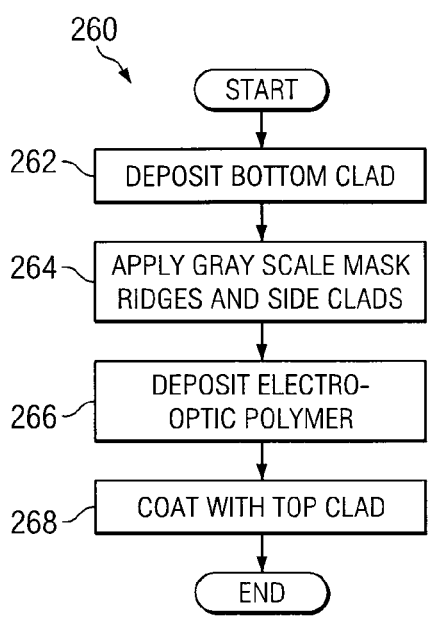
FIG. 7 is a flowchart illustrating a method of fabricating an integrated electro-optic module having the waveguide structures depicted in FIG. 3D.

FIG. 7 is a flowchart illustrating a method, indicated generally at 260, for fabricating an integrated electro-optic module having the waveguide structures depicted in FIG. 3D. At step 262, the fabrication device deposits bottom clad in particular embodiments. A bottom clad may be used with a top clad to surround and assist in the functionality of an electro-optic layer. In some embodiments, bottom clad is formed of a polymer material, such as UV15. In other embodiments, bottom clad is formed of any other suitable material. In particular embodiments, bottom clad is formed by spin coding the bottom cladding material on a wafer and then properly curing the bottom clad. Bottom clad may be bottom clad 52, bottom clad 104, bottom clad 124, bottom clad 144, and/or bottom clad 166.

At step 264, the fabrication device applies a gray scale mask to create different ridge depths. In particular embodiments, gray scale lithography can be applied to create the desired topography in one lithography step. In some embodiments, the difference in core thickness can be conveniently adjusted by the gradient of the grey scale mask. The slope between splitter and modulator may be curved or linear, having any suitable shape.

The fabrication device deposits electro-optic polymer in step 266. In some embodiments, the electro-optic polymer is deposited on the bottom clad and/or side clads. In particular embodiments the electro-optic polymer forms an electro-optic layer having an inverted-ridge waveguide structure. Then, the fabrication device coats the electro-optic polymer with a top clad in step 268. In certain embodiments, top clad is formed of substantially the same material as bottom clad and/or side clads. In other embodiments, top clad may be formed of any suitable material. After step 268 the method ends.

The method described with respect to FIG. 7 is merely illustrative, and it is understood that the manner and order of operation and devices indicated as performing the operations may be modified in any appropriate manner. While the method describes particular steps performed in a specific order, it should be understood that integrated electro-optic module 10 can be fabricated by any suitable collection and arrangement of elements performing some, all, or none of these steps in any operable order. For example, in some embodiments, a top electrode and a bottom electrode are added in additional steps.

Although the present invention has been described in several embodiments, a myriad of changes and modifications may be suggested to one skilled in the art, and it is intended that the present invention encompass such changes and modifications as fall within the present appended claims.

What is claimed is:

1. A method for fabricating an integrated electro-optic module comprising:
   depositing a bottom cladding layer;
   creating side cladding features, the side cladding features having a first ridge depth in a splitter portion and a second ridge depth in a modulator portion, the first ridge depth greater than the second ridge depth;
   depositing an electro-optic polymer, the electro-optic polymer forming an electro-optic layer having a first inverted-ridge structure in the modulator portion and a second inverted-ridge structure in splitter portion; and
   depositing a top cladding layer, the top cladding layer covering the electro-optic layer;
   wherein the splitter portion comprises at least one split for dividing a light wave into a plurality of channels, and
   wherein the modulator portion comprises a plurality of modulators, each modulator corresponding to one of the plurality of channels and comprising a first path, a second path, and an interference point where the first path and the second path intersect.

2. The method of claim 1, wherein the electro-optic layer is continuous between the splitter portion and the modulator portion.

3. The method of claim 1, wherein the electro-optic polymer has optical properties that are changed when an electric field is applied across the electro-optic polymer.

4. The method of claim 1, wherein creating the side cladding features comprises removing a section of the bottom cladding layer, the section having the first ridge depth in the splitter portion and the second ridge depth in the modulator portion.

5. The method of claim 1, wherein creating the side cladding features comprises:
   depositing side cladding material on the bottom cladding layer; and
   patterning the side cladding material to form the side cladding feature;
   wherein the side cladding material deposited in the splitter portion has the first ridge depth and the side cladding material deposited in the modulator portion has the second ridge depth.

6. The method of claim 1, wherein creating the side cladding features comprises:
   removing a section of the bottom cladding layer, the section having a third depth in the splitter portion and the second ridge depth in the modulator portion;
   depositing side cladding material; and
   patterning the side cladding material, the patterned side cladding material having a fourth depth in the splitter portion,
   wherein the first ridge depth is equal to the third depth plus the fourth depth.

7. The method of claim 1, wherein creating the side cladding features comprises removing a section of the bottom cladding layer using gray-scale lithography, the section having the first ridge depth in the splitter portion, the second ridge depth in the modulator portion, and a varying ridge depth between the splitter portion and the modulator portion.

8. The method of claim 1, wherein each modulator comprises a modulator split formed to receive input from the corresponding channel in the splitter portion and to split the received input onto the first path and the second path.

9. The method of claim 8, wherein the electro-optic polymer reduces a speed of the light wave in the first path when an electric field is applied across the first path.

10. The method of claim 1, further comprising forming a bottom electrode and forming a top electrode.

11. An integrated electro-optic module for high speed data transmission comprising:
    at least one optical source operable to create a light wave;
    a splitter portion comprising at least one split for dividing the light wave into a plurality of channels, the splitter portion including an electro-optic polymer, the electro-optic polymer forming an electro-optic layer having a first inverted-ridge structure, the first inverted-ridge structure having a first ridge depth; and
    a modulator portion comprising a plurality of modulators, each modulator corresponding to one of the plurality of channels and comprising a first path, a second path, and an interference point where the first path and the second path intersect, the modulator portion including an electro-optic polymer, the electro-optic polymer forming an electro-optic layer having a second inverted-ridge structure, the second inverted-ridge structure having a second ridge depth,
    wherein the first ridge depth is greater than the second ridge depth.

12. The integrated electro-optic module of claim 11, wherein the electro-optic layer is continuous between the splitter portion and the modulator portion.

13. The integrated electro-optic module of claim 11, wherein the electro-optic polymer has optical properties that are changed when an electric field is applied across the electro-optic polymer.

14. The integrated electro-optic module of claim 11, further comprising:
    a bottom cladding layer deposited on a wafer; and
    side cladding features, the side cladding features having the first ridge depth in the splitter portion and the second ridge depth in the modulator portion.

15. The integrated electro-optic module of claim 14, wherein the side cladding features are created by removing a section of the bottom cladding layer, the section having the first ridge depth in the splitter portion and the second ridge depth in the modulator portion.

16. The integrated electro-optic module of claim 14, wherein the side cladding features are created by:
    depositing side cladding material on the bottom cladding layer; and
    patterning the side cladding material to form the side cladding feature;
    wherein the side cladding material deposited in the splitter portion has the first ridge depth and the side cladding material deposited in the modulator portion has the second ridge depth.

17. The integrated electro-optic module of claim 14, wherein the side cladding features are created by:

removing a section of the bottom cladding layer, the section having a third depth in the splitter portion and the second ridge depth in the modulator portion;

depositing side cladding material; and patterning the side cladding material, the patterned side cladding material having a fourth depth in the splitter portion, wherein the first ridge depth is equal to the third depth plus the fourth depth.

18. The integrated electro-optic module of claim 14, wherein the side cladding features are created by removing a section of the bottom cladding layer using gray-scale lithography, the section having the first ridge depth in the splitter portion, the second ridge depth in the modulator portion, and a varying ridge depth between the splitter portion and the modulator portion.

19. The integrated electro-optic module of claim 11, wherein each modulator comprises a modulator split formed to receive input from the corresponding channel in the splitter portion and to split the received input onto the first path and the second path.

20. The integrated electro-optic module of claim 19, wherein the electro-optic polymer reduces a speed of the light wave in the first path when an electric field is applied across the first path.

21. The integrated electro-optic module of claim 11, further comprising a bottom electrode and a top electrode.

22. A devices for fabricating an integrated electro-optic module comprising:

means for depositing a bottom cladding layer on a wafer;

means for creating side cladding features, the side cladding features having a first ridge depth in a splitter portion and a second ridge depth in a modulator portion, the first ridge depth greater than the second ridge depth;

means for depositing an electro-optic polymer, the electro-optic polymer forming an electro-optic layer having a first inverted-ridge structure in the modulator portion and a second inverted-ridge structure in splitter portion; and means for depositing a top cladding layer, the top cladding layer covering the electro-optic layer;

wherein the splitter portion comprises at least one split for dividing a light wave into a plurality of channels, and wherein the modulator portion comprises a plurality of modulators, each modulator corresponding to one of the plurality of channels and comprising a first path, a second path, and an interference point where the first path and the second path intersect.

* * * * *